United States Patent
Lund et al.

(10) Patent No.: US 10,175,030 B2
(45) Date of Patent: Jan. 8, 2019

(54) THREAT DETECTION

(71) Applicant: Sensors Unlimited, Inc., Princeton, NJ (US)

(72) Inventors: Joshua Lund, Dallas, TX (US); Jonathan Nazemi, Doylestown, PA (US); John Liobe, New York, NY (US)

(73) Assignee: Sensors Unlimited, Inc., Princeton, NJ (US)

( * ) Notice: Subject to any disclaimer, the term of this patent is extended or adjusted under 35 U.S.C. 154(b) by 0 days.

(21) Appl. No.: 15/457,464

(22) Filed: Mar. 13, 2017

(65) Prior Publication Data

US 2018/0259296 A1    Sep. 13, 2018

(51) Int. Cl.
*F41C 9/00* (2006.01)
*F41G 1/36* (2006.01)
*F41G 1/35* (2006.01)
*G01J 5/10* (2006.01)

(52) U.S. Cl.
CPC .............. *F41G 1/36* (2013.01); *F41G 1/35* (2013.01); *G01J 5/10* (2013.01); *G01J 2005/106* (2013.01)

(58) Field of Classification Search
CPC ...... F41G 1/36; F41G 1/35; G01J 5/10; G01J 2005/106
USPC ............................................ 42/1.01, 90, 111
See application file for complete search history.

(56) References Cited

U.S. PATENT DOCUMENTS

| | | | | |
|---|---|---|---|---|
| 5,918,305 A * | 6/1999 | Livingston | .............. | G01S 17/66 89/1.11 |
| 6,069,358 A * | 5/2000 | Colandene | .............. | G01S 7/483 250/330 |
| 6,603,134 B1 * | 8/2003 | Wild | .............. | G02B 5/12 250/342 |
| 7,282,695 B2 * | 10/2007 | Weber | .............. | G01S 7/4802 250/203.1 |
| 7,483,213 B2 * | 1/2009 | Pochapsky | .............. | G03B 33/12 250/330 |
| 7,784,192 B2 * | 8/2010 | Jancic | .............. | F41G 1/35 33/286 |
| 7,928,395 B2 * | 4/2011 | Grimberg | .............. | G01J 5/22 250/349 |
| 8,228,591 B1 * | 7/2012 | Towers | .............. | G01S 17/026 235/454 |
| 8,467,133 B2 * | 6/2013 | Miller | .............. | G02B 27/017 353/28 |
| 8,472,120 B2 * | 6/2013 | Border | .............. | G02B 27/0093 353/28 |

(Continued)

OTHER PUBLICATIONS

"B.E. Meyers & Co. releases the MAWLCLAD, a new SWIR variant of the MAWL series", PoliceOne.com, Oct. 12, 2017; all pages.*

(Continued)

*Primary Examiner* — Samir Abdosh
(74) *Attorney, Agent, or Firm* — Locke Lord LLP; Scott D. Wofsy; Joshua L. Jones

(57) ABSTRACT

A method of threat detection includes illuminating a scene with short-wavelength infrared (SWIR) illumination and receiving a return of the SWIR illumination reflected back from the scene. The method includes analyzing the return of the SWIR illumination to detect presence of man-made optics in the scene. Illuminating, receiving, and analyzing can be performed by a device, e.g., a rifle-mounted laser device.

9 Claims, 3 Drawing Sheets

(56) References Cited

U.S. PATENT DOCUMENTS

| | | | | |
|---|---|---|---|---|
| 8,577,183 | B2* | 11/2013 | Robinson | G01J 3/2823 348/162 |
| 8,581,168 | B2* | 11/2013 | Linder | F41G 7/008 250/208.1 |
| 8,829,404 | B1* | 9/2014 | Rinker | F41G 7/008 250/203.1 |
| RE45,452 | E* | 4/2015 | Kerr | G01S 1/70 250/330 |
| 9,097,891 | B2* | 8/2015 | Border | G02B 27/0093 |
| 9,215,386 | B2* | 12/2015 | Elkind | H04N 5/335 |
| 9,255,808 | B2* | 2/2016 | Andersson | G01C 21/3415 |
| 9,366,862 | B2* | 6/2016 | Haddick | G02B 27/0093 |
| 9,574,759 | B2* | 2/2017 | Nemeyer | H01S 5/00 |
| 2007/0222854 | A1* | 9/2007 | Pochapsky | G03B 33/12 348/33 |
| 2009/0009596 | A1* | 1/2009 | Kerr | G01S 1/70 348/117 |
| 2009/0110019 | A1* | 4/2009 | Houde-Walter | F41G 1/36 372/55 |
| 2009/0224154 | A1* | 9/2009 | Jancic | F41G 1/35 250/330 |
| 2010/0229448 | A1* | 9/2010 | Houde-Walter | F41C 23/16 42/72 |
| 2011/0272580 | A1* | 11/2011 | Houde-Walter | F41G 1/35 250/338.3 |
| 2012/0091347 | A1* | 4/2012 | Houde-Walter | F41G 1/35 250/349 |
| 2012/0119112 | A1* | 5/2012 | Houde-Walter | F41G 1/35 250/492.1 |
| 2012/0154598 | A1* | 6/2012 | Houde-Walter | H04N 5/33 348/164 |
| 2012/0212400 | A1* | 8/2012 | Border | G02B 27/017 345/8 |
| 2012/0262577 | A1* | 10/2012 | Wang | G06K 9/00369 348/148 |
| 2012/0313007 | A1* | 12/2012 | Thomas | F41G 1/35 250/458.1 |
| 2013/0161587 | A1* | 6/2013 | Xianyu | H01L 29/66742 257/29 |
| 2013/0235609 | A1* | 9/2013 | Nemeyer | F21V 13/02 362/553 |
| 2015/0247703 | A1* | 9/2015 | Teetzel | F41G 3/065 356/5.01 |
| 2015/0288892 | A1* | 10/2015 | Frank | H04N 5/2257 348/164 |
| 2015/0345908 | A1* | 12/2015 | Maryfield | F41G 3/06 356/152.1 |
| 2016/0037077 | A1* | 2/2016 | Hansen | H04N 5/2258 348/164 |
| 2016/0086018 | A1* | 3/2016 | Lemoff | G06K 9/00295 382/118 |
| 2016/0161587 | A1 | 6/2016 | Caplan | |

OTHER PUBLICATIONS

"SWIR MAWL-CLAD—Now Even More Invisible IR Laser"; TheFirearmBlog.com; Oct. 12, 2017.*

* cited by examiner

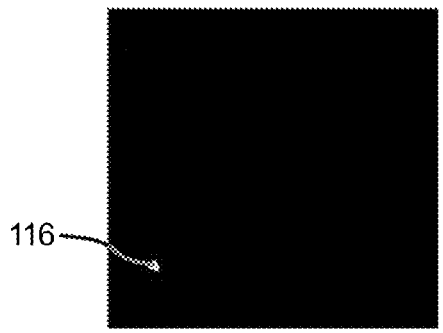
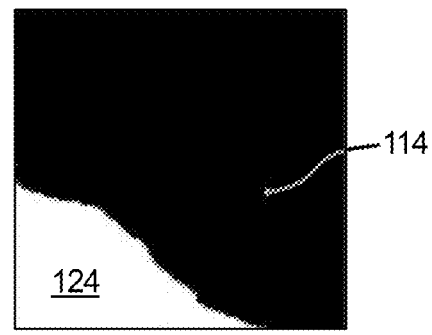
Fig. 3                    Fig. 4
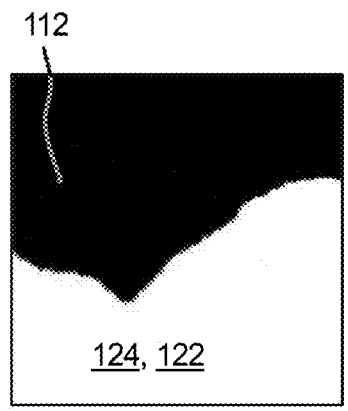
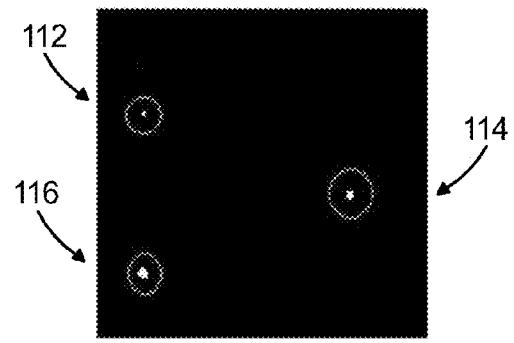
Fig. 5                    Fig. 6

THREAT DETECTION

BACKGROUND OF THE INVENTION

1. Field of the Invention

The present disclosure relates to optical systems, and more particularly to optical systems for threat detection, e.g., pre-shot threat detection.

2. Description of Related Art

There is a desire to have battlefield capability for pre-shot threat detection (PTD) that allows for determining the presence and location of man-made optics which could be enemy sniper scopes, or other surveillance apparatus. Conventional techniques for observing a battlefield can be helpful, e.g., such as detecting threats based on thermal imaging, however known techniques have difficulty distinguishing actual threats from the background.

The conventional techniques have been considered satisfactory for their intended purpose. However, there is an ever present need for improved pre-shot threat detection. This disclosure provides a solution for this problem.

SUMMARY OF THE INVENTION

A method of threat detection includes illuminating a scene with pulsed short-wavelength infrared (SWIR) illumination and receiving a return of the SWIR illumination reflected back from the scene with a receiving device configured to detect pulsed SWIR illumination. The method includes analyzing the return of the SWIR illumination to detect presence of man-made optics in the scene.

Illuminating, receiving, and analyzing can be performed by a device, e.g., a single rifle-mounted laser device. Receiving the return can be performed by a SWIR-sensitive focal plane array (FPA) of a receiving device that is operatively connected to a module for pixel-wise processing of return signals. Illuminating can be performed by a SWIR illumination source configured to emit pulsed SWIR illumination, wherein the receiving device is configured to detect pulsed SWIR illumination. Illuminating the scene and receiving the return can be performed with the SWIR illumination source synchronized with the receiving device for pulse detection in the return of the SWIR illumination from the scene. It is also contemplated that illuminating the scene and receiving the return can be performed with the SWIR illumination source and receiving device asynchronously, wherein the receiving device has a scan rate high enough to continuously detect illumination pulses and perform synchronization in post-process calculation.

The FPA can be configured for global threshold control. Illuminating the scene can include illuminating the scene in a series of pulsed illumination events, and receiving can include receiving return signals for each of the pulsed illumination events at a different respective threshold level of the FPA. The method can include generating a respective pulse event bitmap for each threshold level of the FPA. Each pulse event bitmap can be processed with a spatial filter to identify any reflected returns below a predetermined pixel size threshold to identify returns of significance indicative of man-made optics. The method can include outputting an alert for each reflected return identified as a return of significance. For example, indicia can be displayed for each return of significance overlaid on an image of the scene to identify location in the scene of each return of significance.

A system includes a SWIR-sensitive FPA configured to receive a return of SWIR illumination from a scene. A module is operatively connected to the FPA to analyze the return to detect presence of man-made optics in the scene. The system can include a SWIR illumination source configured to illuminate the scene with SWIR illumination. The FPA, SWIR illumination source, and module can all be part of a single, rifle-mounted laser device. The module can include or connect to an alert module including an audible and/or visual display configured to alert an operator of the system to the presence of man-made optics in the scene.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIGS. 3-5 are schematic views of the scene of FIG. 1, as imaged successively at three different threshold levels in the focal plane array (FPA); and FIG. 6 is an exemplary bitmap showing three positive returns isolated from the three images of FIGS. 3-5.

DETAILED DESCRIPTION OF THE PREFERRED EMBODIMENTS

Figure 1:
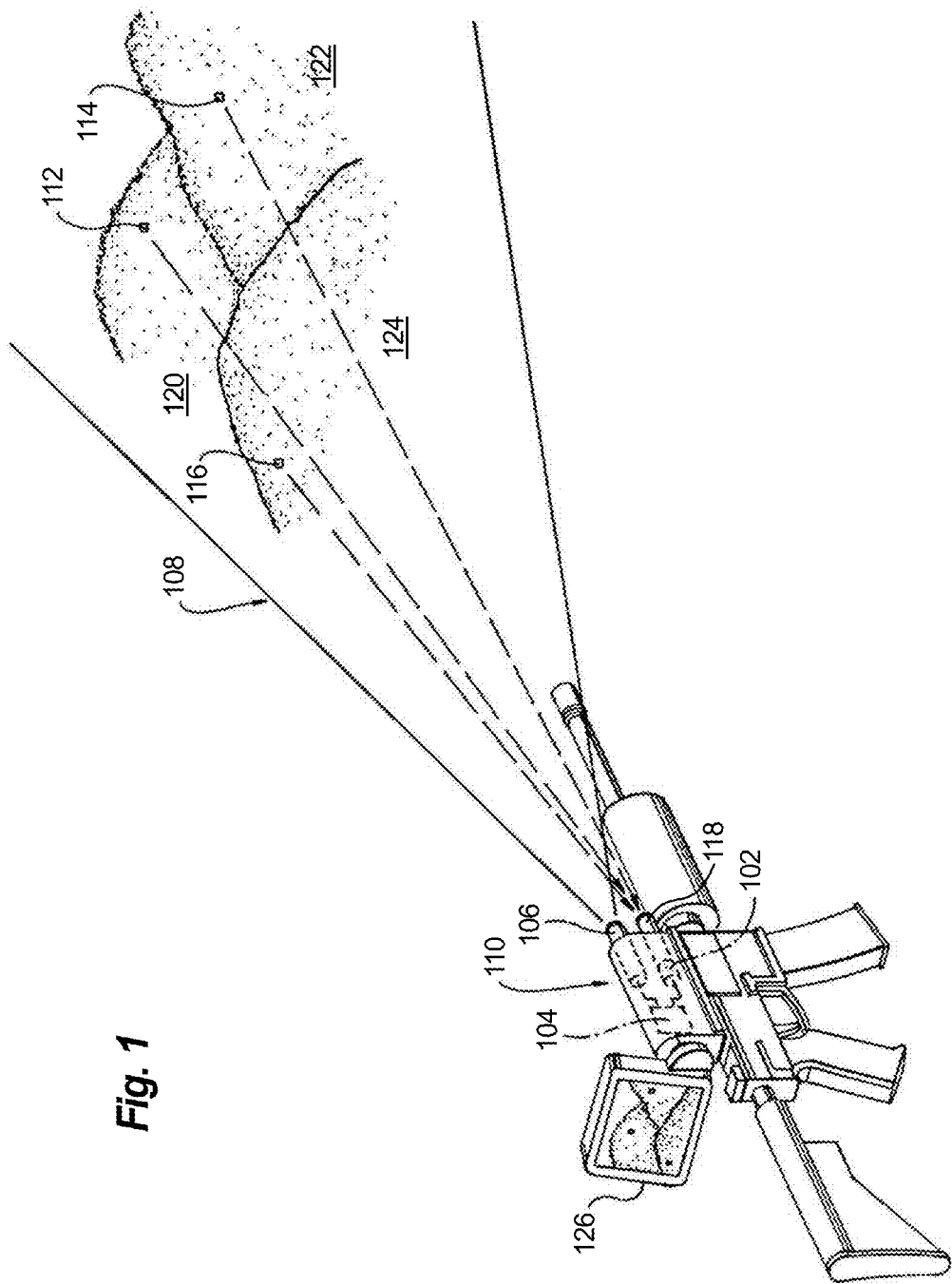
FIG. 1 is a schematic view of an exemplary embodiment of a system constructed in accordance with the present disclosure, showing a rifle-mounted device illuminating a scene and receiving returns from the scene.

Reference will now be made to the drawings wherein like reference numerals identify similar structural features or aspects of the subject disclosure. For purposes of explanation and illustration, and not limitation, a partial view of an exemplary embodiment of a system in accordance with the disclosure is shown in FIG. 1 and is designated generally by reference character 100. Other embodiments of systems in accordance with the disclosure, or aspects thereof, are provided in FIGS. 2-6, as will be described. The systems and methods described herein can be used to detect man-made optics, for example in pre-shot threat detection.

System 100 includes a short-wavelength infrared (SWIR) sensitive FPA 102 configured to receive a return of SWIR illumination from a scene. FPA 102 is part of a receiving device 118 such as a camera or the like. A module 104 is operatively connected to the FPA to analyze the return to detect presence of man-made optics in the scene, e.g., to attribute the presence of man-made optics in the scene to the received SWIR illumination. System 100 includes a SWIR illumination source 106 configured to illuminate the scene with SWIR illumination, e.g., as indicated schematically in FIG. 1 with illumination cone 108. The FPA 102, SWIR illumination source 106, and module 104 can all be part of a single, portable device such as rifle-mounted laser device 110. Module 104 can include or connect to an alert module including an audible and/or visual display configured to alert an operator of the system to the presence of man-made optics in the scene.

A method of threat detection includes illuminating a scene with SWIR illumination, e.g. as mountains in the scene of FIG. 1 are illuminated by SWIR illumination cone 108 from source 106. The method includes receiving a return of the SWIR illumination reflected back from the scene, as in the significant returns indicated by dashed lines in FIG. 1 to show reflected SWIR illumination from objects 112, 114, and 116. The method includes analyzing the return of the SWIR illumination to detect presence of man-made optics, such as used in telescopes, rifle mounted scopes, binoculars, rocket propelled grenade (RPG) sights, FPA imaging devices, and the like, that may be in the scene.

Illuminating, receiving, and analyzing can be performed by a device, e.g., a single rifle-mounted laser device such as system 100. Receiving the return can be performed by a SWIR-sensitive focal plane array (FPA), e.g., FPA 102, of a receiving device, e.g., receiving device 118 in system 100. A module, e.g. module 104, is operatively connected to the FPA of the receiving device for pixel-wise processing of return signals. Illuminating can be performed by a SWIR illumination source, e.g. source 106, that is configured to emit pulsed SWIR illumination, wherein the receiving device is configured to detect pulsed SWIR illumination, e.g., with FPA 102 and/or module 104, detection of pulsed SWIR illumination being performed with a frequency-filtered pulse detection pixel. Illuminating the scene and receiving the return can be performed with the SWIR illumination source, e.g. source 106, synchronized with the receiving device, e.g., receiving device 118, for pulse detection in the return of the SWIR illumination from the scene. It is also contemplated that illuminating the scene and receiving the return can be performed with the SWIR illumination source and receiving device asynchronously, wherein the receiving device has a scan rate high enough to continuously detect illumination pulses and perform synchronization in post-process calculation, e.g., in module 104.

Figure 2:
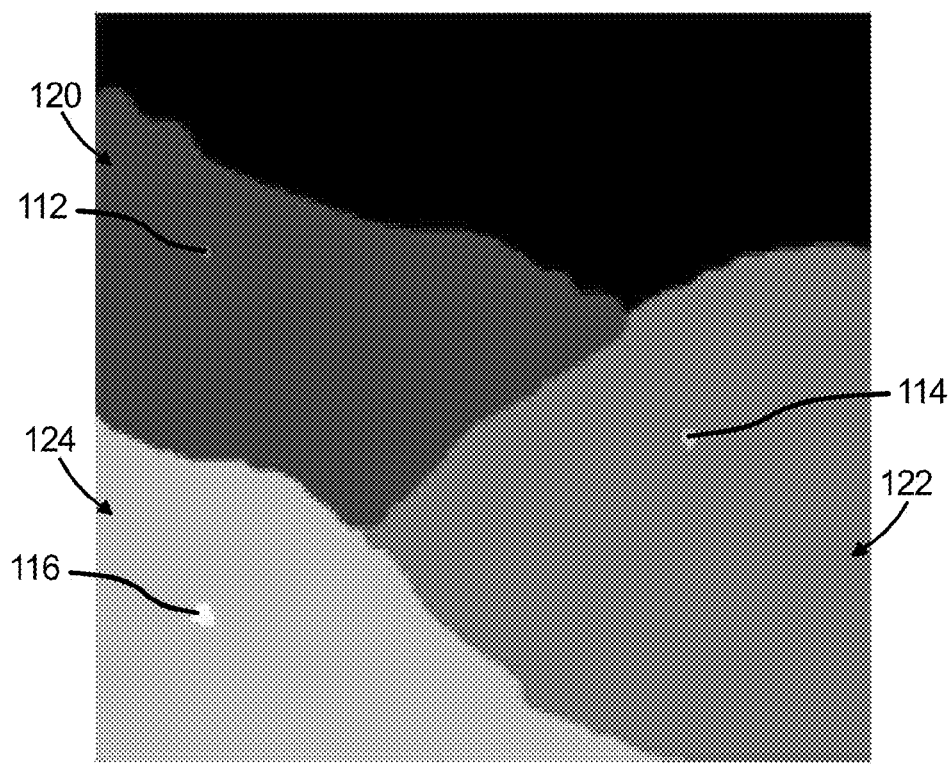
FIG. 2 is a schematic view of the scene of FIG. 1, showing the scene as a single high dynamic range (HDR) composite.

With reference now to FIGS. 2-6, the FPA 102 can be configured for global threshold control for detecting pulsed illumination. The global threshold control may set a threshold of return laser energy that is detected as a pulse event by a pixel in the SWIR FPA 102. In FIG. 2, the scene of FIG. 1 is shown with three mountains 120, 122, and 124, each having a source of SWIR reflection corresponding to one of the objects 112, 114, and 116. Illuminating the scene can include illuminating the scene in a series of pulsed illumination events, and receiving can include receiving return signals for each of the pulsed illumination events at a different respective threshold level of the FPA. The method can include generating a respective pulse event bitmap for each threshold level of the FPA. As an example of a series of pulsed illumination events having three threshold levels, FIG. 3 is a bitmap of a first illumination event at a first FPA level that isolates object 116 from mountain 124, FIG. 4 is a bitmap of a second illumination event at a second FPA level that isolates object 114 from mountain 122, and FIG. 5 is a bitmap of a third illumination event at a third FPA level that isolates object 112 from mountain 120. Each pulse event bitmap can be processed with a spatial filter to identify any reflected returns below a predetermined pixel size threshold, e.g., to filter out mountains 124 and 122 in the bitmaps of FIGS. 4 and 5, to identify returns of significance indicative of man-made optics. FIG. 6 shows a resulting bitmap with only the returns of significance showing, e.g., corresponding to objects 112, 114, and 116. The method can include outputting an alert for each reflected return identified as a return of significance. For example, indicia such as the rings around objects 112, 114, and 116 in FIG. 6, can be displayed for each return of significance overlaid on an image of the scene to identify location in the scene of each return of significance as shown in display 126 of FIG. 1. It should be noted that the technique above can identify object 112 even if the value of the pixels corresponding to object 112 is lower than the value of the pixels corresponding to mountain 124, because object 112 is isolated from its local back round, e.g., mountain 120, in a separate threshold level bitmap from objects 114 and 116. This capability provides for improved separation of threats from background images compared to traditional techniques.

Traditionally, the returns may be observed with standard imaging sensors with short exposure times. This limits the amount of background signal, but not as well as a frequency-filtered pulse detection pixel as described herein, which has better effective signal to noise for high frequency events. If only one illumination return is captured with a pulse detection pixel, it is for a single, fixed sensitivity threshold. This may be an issue for certain conditions where the return signal is globally high (such as from a very high reflective surface at a short distance) or very low (such as for a low reflectance surface at a long distance). In these instances, the return could be saturated or fail to show to signal all depending on the threshold setting. The multiple illumination events described herein, with different pulse detection threshold sensitivities, provide dynamic range in the pulse detection domain and can effectively discriminate very SWIR reflective objects from their background.

The methods and systems of the present disclosure, as described above and shown in the drawings, provide for pre-shot threat detection with superior properties including the ability to not only detect, but to identify the location of threats, and to do so with a high-dynamic range, and improved isolation of threats from the background compared to traditional techniques. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method of threat detection comprising:
    illuminating a scene with pulsed short-wavelength infrared (SWIR) illumination;
    receiving SWIR illumination reflected back from the scene with a receiving device configured to detect pulsed SWIR illumination;
    analyzing the received SWIR illumination; and
    attributing the presence of man-made optics in the scene to the received SWIR illumination, wherein illuminating, receiving, and analyzing are performed by a single rifle-mounted laser device, wherein the receiving is performed by a SWIR-sensitive focal plane array (FPA) of a receiving device that is operatively connected to a module for pixel-wise processing of the received SWIR illumination, wherein the FPA is configured for global threshold control, wherein the illuminating the scene includes illuminating the scene in a series of pulsed illumination events, and wherein the receiving includes receiving SWIR illumination reflections for each of the pulsed illumination events at a different respective threshold level of the FPA, further comprising generating a respective pulse event bitmap for each threshold level of the FPA.

2. The method as recited in claim 1, wherein the illuminating is performed by a SWIR illumination source configured to emit pulsed SWIR illumination, wherein the receiving device is configured to detect pulsed SWIR illumination.

3. The method as recited in claim 2, wherein the illuminating the scene and receiving the return are performed with the SWIR illumination source synchronized with the receiving device for pulse detection in the SWIR illumination reflected from the scene.

4. The method as recited in claim 2, wherein the illuminating the scene and receiving are performed with the SWIR illumination source and receiving device asynchronously, wherein the receiving device has a scan rate high enough to continuously detect illumination pulses and perform synchronization in post-process calculation.

5. The method as recited in claim 1, further comprising processing each pulse event bitmap with a spatial filter to identify any reflection received that are below a predetermined pixel size threshold to identify returns of significance indicative of man-made optics.

6. The method as recited in claim 5, further comprising outputting an alert for each reflection received that is identified as a return of significance.

7. The method as recited in claim 6, further comprising displaying indicia for each return of significance overlaid on an image of the scene to identify location in the scene of each return of significance.

8. A system comprising:

a SWIR-sensitive FPA configured to receive SWIR illumination reflected from a scene; and a module operatively connected to the FPA configured to analyze the received reflections for the presence of man-made optics in the scene, wherein the FPA is operatively connected to the module for pixel-wise processing of received SWIR illumination, wherein the FPA is configured for global threshold control, further comprising a SWIR illumination source configured to illuminate the scene with SWIR illumination, wherein the SWIR-sensitive FPA, SWIR illumination source, and module are all part of a single portable device, wherein the device is a rifle mounted laser device, wherein the SWIR illumination source is configured to illuminate the scene in a series of pulsed illumination events, and wherein the FPA is configured for receiving SWIR illumination reflections for each of the pulsed illumination events at a different respective threshold level of the FPA, and wherein the module is configured to generate a respective pulse event bitmap for each threshold level of the FPA.

9. The system as recited in claim 8, further comprising an alert module including an audible and/or visual display configured to alert an operator of the system to the presence of man-made optics in the scene.

* * * * *